Dec. 16, 1930.  W. E. CURRIE ET AL  1,784,890
CATTLE STANCHION
Filed Sept. 28, 1928
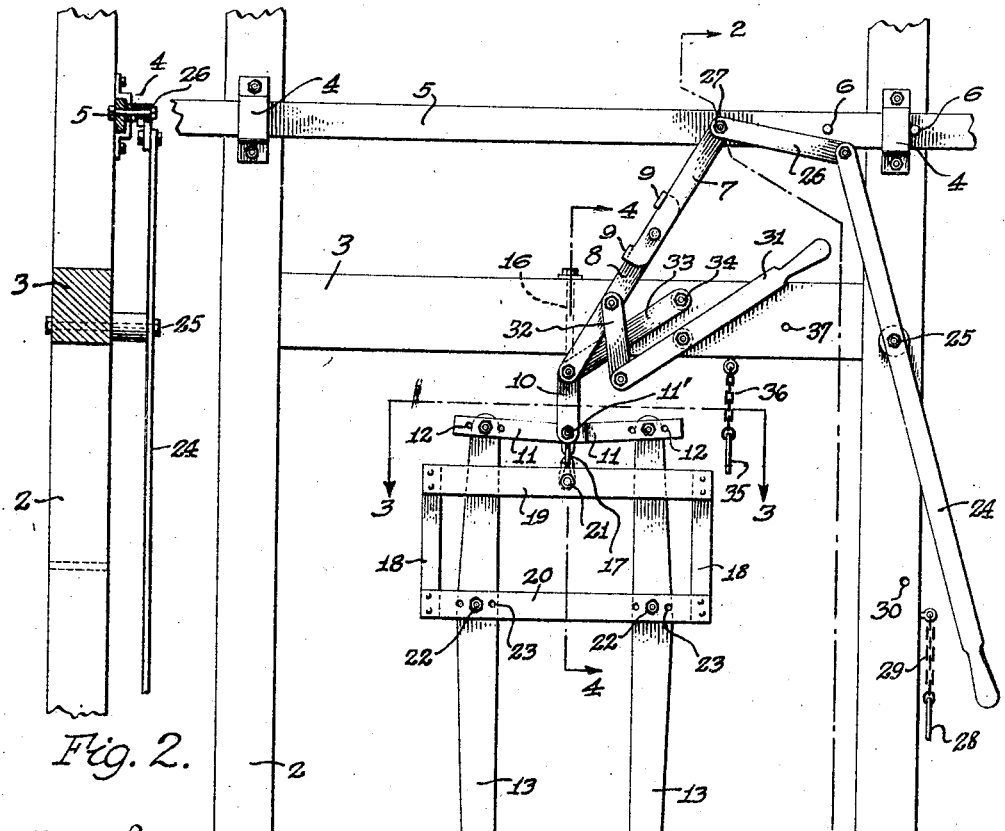
Fig. 2.
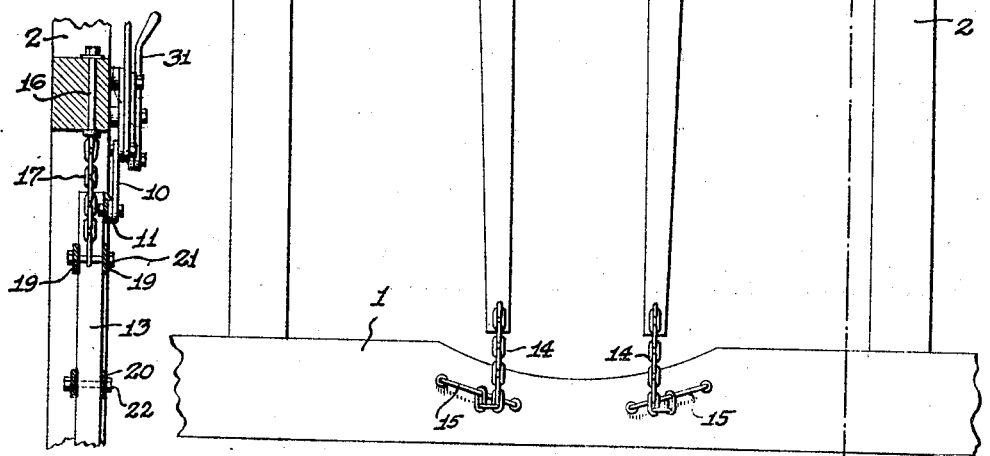
Fig. 4.
Fig. 3.
Fig. 1.
Inventor
William E. Currie,
Peter de Vries,
Attorneys Patented Dec. 16, 1930

1,784,890

UNITED STATES PATENT OFFICE

WILLIAM E. CURRIE, OF LAKE JOVITA, FLORIDA, AND PETER DE VRIES, OF DETROIT, MICHIGAN; SAID PETER DE VRIES ASSIGNOR TO WILLIAM E. CURRIE

CATTLE STANCHION

Application filed September 28, 1928. Serial No. 308,982.

The present invention pertains to a novel cattle stanchion constructed for the purpose of retaining cattle in a given position and preventing their escape therefrom.

The principle object of the invention is to provide a mechanism whereby a series of stanchions may be simultaneously operated by a slidable bar common to all of them and connected to the operating mechanism of each unit. Moreover, the invention comprises simple means whereby any one stanchion may be operated independently of the others. With the latter object in view, a separate operating lever is provided with each stanchion and is linked to the operating mechanism thereof in such a manner that the latter may be actuated without movement of the common operating bar and hence without affecting the remaining stanchions.

The invention is fully disclosed by way of example in the following description and in the accompanying drawings in which Figure 1 is a front elevation of the device;

Fig. 2 is a vertical section on the line 2—2 of Fig. 1;

Fig. 3 is a section on the line 3—3 of Fig. 1; and

Fig. 4 is a section on the line 4—4 of Fig. 1.

Reference to these views will now be made by use of like characters which are employed to designate corresponding parts throughout.

The stanchion proper is positioned within a frame consisting of a base board 1, a pair of uprights 2 and a connecting top bar 3. Above the bar 3, the uprights 2 carry straps 4 in which a bar 5 is slidably mounted. Several such units may be arranged in series, a single bar 5 may be common to all of them. The bar carries pins 6 at opposite sides of one of the straps 4 of each unit, or even one unit, whereby the limits of the movement of the bar are determined.

To the slidable bar 5 is pivoted one end of an arm 7 having an operating link 8 pivotally attached to its lower end. The connected ends of these members overlap as shown in Fig. 1 and are provided with lugs 9 extending over the edge of the adjacent member and both disposed at one side of the longitudinal axis of the member 7. It will be obvious that these lugs permit the connected ends of the members 7 and 8 to swing in only one direction.

The link 8 extends to a point below the lower edge of the member 3 and has a depending short link 10 pivoted to its lower end. To the short link in turn is pivotally attached an articulated cross arm 11 having a series of apertures 12 in each end thereof. The connection to the link 10 is made at the point of articulation 11' of the member 11. Neck bars 13 are suspended from the ends of the cross bar 11 and may be adjusted in the apertures 12 thereof for animals of various sizes. To the lower or free ends of the bars 13 are connected chains 14 which are slidable on rods 15 carried by the base member 1. This construction prevents the lower ends of the neck bars from becoming entirely free from the base board although they are movable relatively thereto.

A bolt 16 is passed vertically and centrally through the bar 3 and has a chain 17 hanging therefrom. To the chain is attached a loose rectangular frame 18 having a double upper side 19 and a double lower side 20. The connection is made by means of a stud 21 passed centrally through the side 19 and also through the lowermost link of the chain 17. The neck bars 13 passed between the sections of the double top and bottom are pivotally connected to the latter by bolts 22. The bottom member has a series of apertures 23 for each bolt 22, so that the latter may be fixed in various positions to regulate the normal spacing between the neck bars 13.

To one of the uprights 2 is attached an operating lever 24 at an intermediate pivot point 25 and the upper end of the lever is joined to the arm 7 by means of a link 26. The connecting stud 27 between the link 26 and the arm 7 is also attached to the sliding bar 5.

When the lower end of the lever 24 is swung in clockwise direction, the bar 5 is moved to the right, and the operating link 8 is pulled in a generally upward direction. The cross bar 11 is pulled upwardly at the point 11', as a result of which the upper pivot points of the neck bars 13 are brought towards each other and the opening between the bars is enlarged to release the cattle. If the bar 5 is connected in like manner to a series of similar stanchion units, all will be opened in the manner described by actuation of the common lever 24. The movement of the bar 5 in either direction is limited by the pins 6 as already indicated. The open position of the lever 24 may be secured by means of a pin 28 attached to the frame by a chain 29 and receivable in an aperture 30 in the frame.

In order that any particular unit may be operated separately and independently of the others, each is equipped with an auxiliary lever 31 pivoted to the corresponding cross bar 3. The free end of the lever is joined by a link 32 to substantially the mid-point of the member 8. The point of connection between the members 8 and 10 is caused to move in an arc of fixed radius by means of a link 33 attached thereto at one end and having its other end pivotally mounted at 34 on the bar 3. On moving the handle of the lever 31 downwardly, the point of articulation 11' will be raised, and the opening between the bars 13 will be enlarged in the manner already described. The lever 31 may be held in its lowered or open position by means of a pin 35 suspended from the bar 3 by a chain 36 and receivable in an aperture 37 in the bar. Obviously, the reverse movements of the levers 24 and 31 result in a reverse position from that described.

Although a specific embodiment of the invention has been illustrated and described, it will be understood that various alterations in the details of construction may be made without departing from the scope of the invention as indicated by the appended claims.

What we claim is:—

1. A stanchion comprising a frame, a bar slidably supported by said frame, a link suspended from said frame, a pair of neck bars suspended from said link and adapted to be operated thereby, a loose frame suspended from said first named frame having the neck bars pivoted thereto, a connection between said slidable bar and link for operating the latter and the neck bars, means for sliding said slidable bar, and means independent of said slidable bar for operating said link.

2. A stanchion comprising a frame, a bar slidably supported by said frame, a link suspended from said frame, a pair of neck bars suspended from said link and adapted to be operated thereby, a loose frame suspended from said first named frame having the neck bars pivoted thereto, a connection between said slidable bar and link for operating the latter and the neck bars, means for sliding said slidable bar, and a lever pivoted to said frame and operatively connected to said link independently of said slidable bar.

3. A stanchion comprising a frame, a bar slidably supported by said frame, a link suspended from said frame, an articulated cross arm carried by said link, a pair of neck bars suspended from said arm, a loose frame suspended from said first named frame and having said neck bars pivoted thereto, a connection between said slidable bar and link for operating the latter and the neck bars, means for sliding said slidable bar, and means independent of said slidable bar for operating said link.

4. A stanchion comprising a frame, a bar slidably supported by said frame, a link suspended from said frame, an articulated cross arm carried by said link, a pair of neck bars suspended from said arm, a loose frame suspended from said first named frame and having said neck bars pivoted thereto, a connection between said slidable bar and link for operating the latter and the neck bars, means for sliding said slidable bar, means independent of said slidable bar for operating said link, and a lever pivoted to said frame and operatively connected to said link independently of said slidable bar.

In testimony whereof we affix our signatures.

WILLIAM E. CURRIE.
PETER DE VRIES.